April 2, 1963  F. N. PIASECKI  3,083,935
CONVERTIBLE AIRCRAFT

Filed Jan. 15, 1962  2 Sheets-Sheet 1

INVENTOR
*Frank N. Piasecki*

BY
*Mason, Fenwick & Lawrence*
ATTORNEYS

April 2, 1963　　　F. N. PIASECKI　　　3,083,935
CONVERTIBLE AIRCRAFT

Filed Jan. 15, 1962　　　　　　　　　　　2 Sheets-Sheet 2

INVENTOR
Frank N. Piasecki

BY Mason, Fenwick & Lawrence
ATTORNEYS

United States Patent Office
3,083,935
Patented Apr. 2, 1963

3,083,935
CONVERTIBLE AIRCRAFT
Frank N. Piasecki, Haverford, Pa., assignor to Piasecki Aircraft Corporation, Philadelphia, Pa., a corporation of Pennsylvania
Filed Jan. 15, 1962, Ser. No. 166,290
6 Claims. (Cl. 244—12)

The present invention relates in general to vertical take-off and landing aircraft and more particularly to aircraft of the vertical take-off and landing type having lifting rotors, wherein the design is such as to afford high speed forward flight during which lift is obtained by means of fixed wings as in a conventional airplane.

Modern high-speed airplanes of both the jet propelled and propeller driven types are usually designed so as to have relatively small wing spread or wing area in order to provide minimum drag at the normal operating speeds of the aircraft. Since the wing design and lift coefficient must be designed for the higher speed ranges obtainable by the aircraft, the wings provide inadequate lift for low speed landing and take-off. Accordingly, a significant disadvantage of such aircraft is that they are required to land and take-off at very high speeds.

It has been heretofore recognized that the incorporation of lift rotors in such aircraft, serving in effect as helicopter units, for increasing the lift at the will of the pilot to permit lower speed landings and take-offs or to effect substantially vertical movement of the aircraft, may permit operation of the aircraft under a much wider range of conditions and substantially reduce the hazards and disadvantages arising from the small wing area. This type of configuration, with a highly loaded lifting rotor associated with each wing, as by submerging the rotor in the associated wing, has been proposed several times by others. A major unsolved problem associated with such designs, however, is the closure of the fan or rotor duct. For high speed flight, a smooth, uninterrupted wing is obviously desirable. In hovering and slow forward speed on the other hand, most or all of the lift for the aircraft is derived from the rotors or fans, which require a substantial opening through the wing. An effective solution of this duct closure problem requires a method or mechanism for closure which, during no stage of closure or of transition between these two regimes will interfere with the lift and control forces on the aircraft. Systems of shutters, louvre type closures, and flaps have been proposed at various times, but have not satisfactorily met the above requirement.

Where the rotor duct is incorporated in each wing and shutters or similar closures are drawn over the entrances and exits to the rotor ducts to form a continuation of the wing surface in forward flight, a serious problem is introduced which adversely affects attainment of high speeds which the aircraft should otherwise reach. The transition regime of flight is the one in which the wing is operating at its highest lift coefficient. As the speed of the aircraft increases beyond the transition range, the lift coefficient decreases, and to have minimum drag, the wing should be preferably smaller than at the low speed but certainly not larger. However, in the arrangement described above wherein closure shutters are provided, a larger wing surface than is necessary obviously results when the shutters are drawn over the rotor duct since the wing portions outboard of the rotors are by themselves adequate for the transition regime and are therefore more than adequate at the higher speeds. The enlarged wing area produced by closure of the lifting rotor ducts therefore introduces greater drag which adversely affects the operation characteristics of the aircraft.

An object of the present invention, therefore, is the provision of a novel vertical take-off and landing aircraft having lifting rotors associated with wings in a novel manner facilitating attainment of high speed forward flight.

Another object of the present invention is the provision of a novel aircraft designed for vertical take-off and landing and for high speed forward flight, having improved operative characteristics.

Another object of the present invention is the provision of a vertical take-off and landing aircraft capable of high speed forward flight, having lifting rotors to provide the lift for vertical or very slow speed flight and wings which are shiftable spanwise to cover and uncover the rotor ducts, to provide an aircraft having improved operating characteristics.

Another object of the present invention is the provision of a novel aircraft of the vertical take-off and landing type capable of high speed forward flight, wherein lifting rotors are provided in rotor ducts positioned adjacent the fuselage at the wing location, together with wings which may be supported at an extended position to uncover the rotor ducts and which may be retracted inboard to completely cover the rotor ducts and produce smooth, uninterrupted wings.

Other objects, advantages and capabilities of the present invention will become apparent from the following detailed description, taken in conjunction with the accompanying drawings, illustrating one preferred embodiment of the invention.

Figure 1:
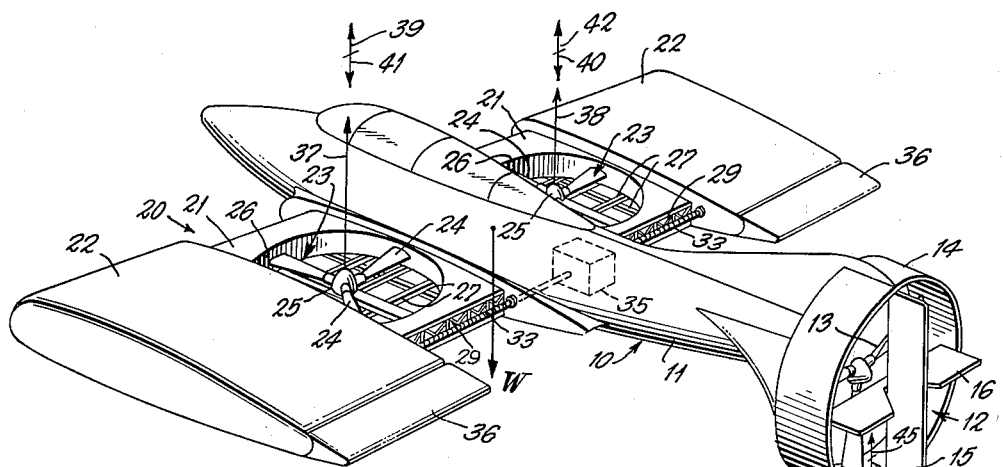
FIGURE 1 is a perspective view of an aircraft embodying the present invention, viewed from aft of the wing axis.
Figure 3:
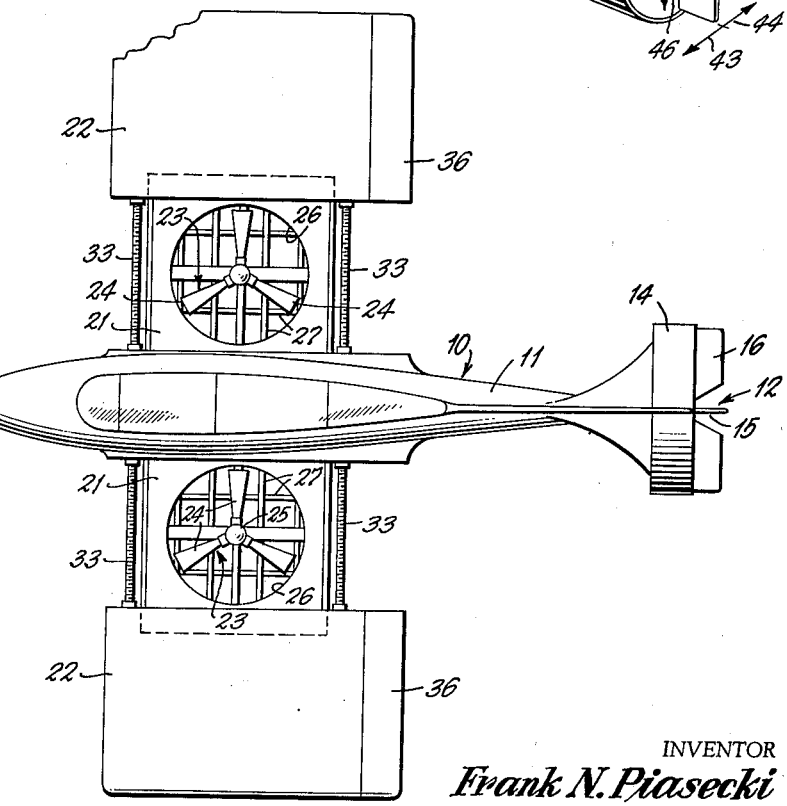
FIGURE 3 is a top plan view of the aircraft, with the wings in extended position.
Figure 2:
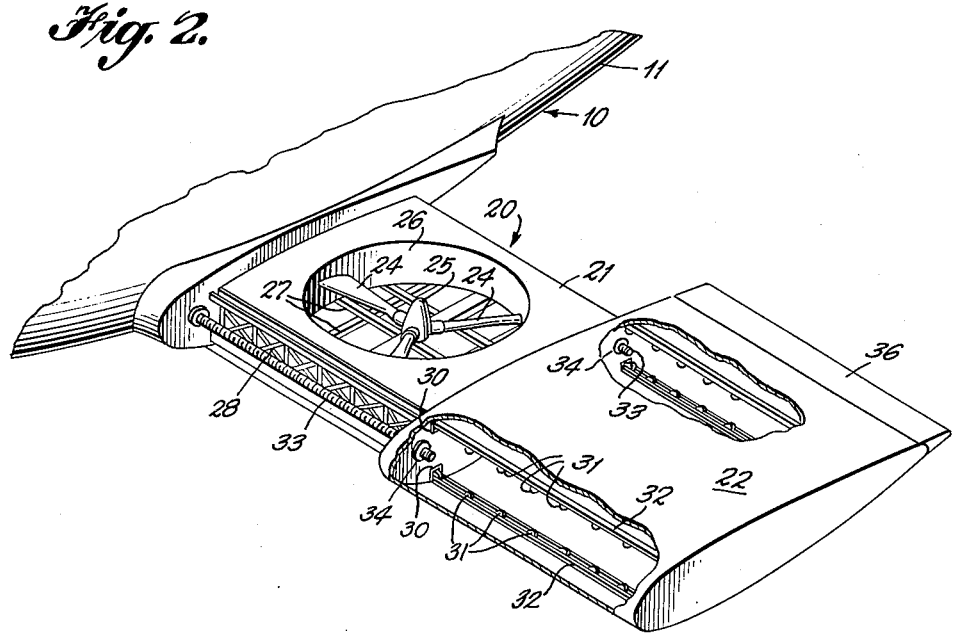
FIGURE 2 is a perspective view of the aircraft, viewed from forward of the wing axis.
Figure 4:
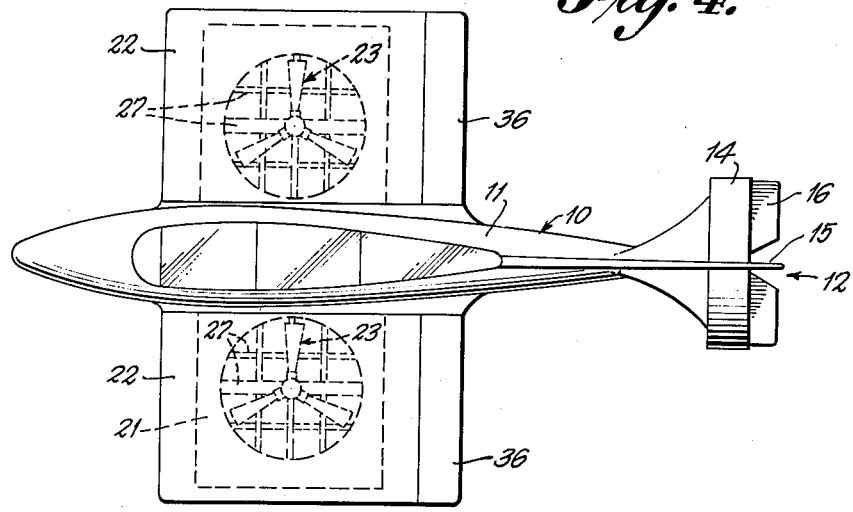
FIGURE 4 is a top plan view of the aircraft, with the wings in retracted position.

Referring to the drawings, wherein like reference characters designate corresponding parts throughout the several figures, there is shown one form of aircraft generally designated by the reference character 10 constructed in accordance with the present invention, by way of example, having an elongated fuselage 11. Forward propulsion may be produced by any of the well-known types of aerodynamic propulsion means such as a propeller or a jet engine. In the configuration illustrated by way of example, propulsion is obtained by means of a shrouded propeller assembly 12 including a propeller 13 supported at the rear end of the fuselage for rotation about the longitudinal axis of the fuselage, surrounded by an annular shroud 14 supported from the fuselage and in turn pivotally supporting a rudder 15 to obtain yaw control of the aircraft and an elevator 16 to obtain pitch control.

Extending laterally from the fuselage 11 and supported therefrom are a pair of sliding wing units generally indicated by the reference character 20. These sliding wing units are substantially identical in construction so that the structure of only one of the wing units need be further described for a clear understanding of the invention. Each of the sliding wing units 20 is formed of two basic sections, a rotor housing section 21 located at the inboard or root end of the wing unit immediately adjacent the fuselage and a hollow wing section 22 having a shape, size and surface contour designed to provide proper aerodynamic and lift characteristics during normal high speed forward flight of the aircraft. The rotor housing section 21 forms the supporting body for the associated hollow wing section 22 and houses a lifting rotor fan 23, here shown as having three blades 24 extending radially from a central hub 25, which is disposed to rotate about a vertical axis within a cylindrical rotor or fan duct 26. A gridwork of deflector vanes 27 are provided at the lower end of the rotor duct 26, including a plurality of deflector vanes arranged parallel to the wing axis and a plurality of deflector vanes arranged perpendicular to the wing axis, to modify the thrust produced by the lifting rotors 23 in a known manner.

The rotor housing sections 21 are each telescopically related to their associated hollow wing sections 22 and to this end are dimensioned to be of slightly less depth and width than their companion wing sections and are bounded at their leading and trailing edges with wing spars 28, 29 having upwardly and downwardly opening track channels 30 forming trackways for rollers 31 suitably supported on structural frame members 32 provided in the hollow wing sections 22 and spaced vertically to accommodate the wing spars 28, 29 therebetween. The hollow wing sections 22 may be constructed in accordance with conventional engineering practice with the spars for the hollow wing sections spaced apart a sufficient distance fore and aft of the aircraft to provide a hollow area within the wing section 22 within which the entire companion rotary housing 21 may be telescopically received. Suitable screwjacks 33 intercoupled with threaded collars 34 provided in the innermost rib of the hollow wing section 22 extend span-wise alongside the wing spars 28, 29 from the fuselage 11 and are controlled by a suitable drive mechanism indicated generally at 35 within the fuselage 11 to permit pilot control of the driving of screwjacks 33 for extending and retracting the hollow wing sections 22 relative to the rotor housing sections 21. The hollow wing sections 22 are provided with the usual wing control surfaces, such as ailerons 36, for controlling roll of the aircraft during high speed forward flight.

By this arrangement, complete transition at any desired rate between flight with the lifting rotors or helicopter units or flight with the wing sections is permitted. For vertical flight as in take-offs and landings, and for hovering and very slow speed flight, the lifting rotors 23 supply the entire lift force for the aircraft, or nearly all the lift force in the case of slow speed flight, the wing section 22 being extended to the outboard position but the air flow over the wings being inadequate to provide any appreciable lift.

As the forward speed of the aircraft is increased under the influence of the propulsive device, the wing sections 22 at the outboard position will assume a continuously larger share of the necessary lift, since they are continuous aerodynamic surfaces and can produce lift for supporting the aircraft even in the extended position. As the wing sections 22 provide a progressively greater portion of the lift, the blades of the lifting rotors 23 may be progressively reduced in pitch until the thrust of the rotors is reduced to zero.

Control of the aircraft is achieved during hovering or slow speed flight, when the wing sections 22 are extended, in the following manner. Lift is produced by symmetrical forces at each lift rotor or fan 23, indicated by the arrows 37, 38 in FIGURE 1, which must be symmetrically disposed and substantially in the same vertical plane as the center of gravity of the aircraft, illustrated by the arrow W. Roll control is produced by differentially changing the thrust of the lift rotors 23 as illustrated diagrammatically by the arrows 39 and 40 or 41 and 42. Forward propulsion is produced by any of the well-known types of aerodynamic propulsion means, a shrouded propeller 12 being the propulsion means provided in the illustrated embodiment. Yaw control is obtained by means of the rudder 15, mounted in the slip stream of the propulsion device and producing forces at the tail of the aircraft to the left or to the right as shown by the arrows 43 and 44. Pitch control is obtained by the elevator surfaces 16 placed in the slip stream of the propulsion device and causing an upward or downward force at the tail as shown by the arrows 45 and 46.

During the transition regime, as the wing sections 22 assume a continuously larger share of the necessary lift during increase of the forward air speed and the lifting rotors 23 contribute progressively less lift forces, control about all axes remain the same as described in the hovering or slow speed flight conditions with the exception of roll, which will now be obtained by means of conventional ailerons 36 on the wing sections 22. The wing sections 22 should be so disposed that the center of pressure of the wings lies in substantially the same vertical plane as the center of gravity of the aircraft and the axes of the lifting rotors.

When the forward speed of the aircraft is advanced sufficiently so that the air flow over the wing sections 22 will provide the entire lift force necessary to sustain the aircraft, the wing sections 22 can then be retracted inboard by rotation of the screwjack 33 so that the rotor housing sections 21 are completely covered and the wing units 20 present a smooth, unbroken airfoil.

While in the illustrative embodiment herein described and shown, the wing sections 22 are provided with rollers 31 which ride on tracks provided by the channels 30 on the wing spars 28, 29 at the leading and trailing edges of the rotor housing sections 21, it will be apparent that many different types of structures and mechanisms known to the aeronautical arts may be used for supporting and retracting the wing sections 22.

By this arrangement, the transition between the hovering or slow speed conditions and the high speed flight conditions may be achieved without undesirable interference with the lift and control forces on the aircraft, since there are no hinged flaps or members of like character wihch would disturb the aerodynamic characteristics of the smooth airfoil surfaces provided by the wing sections 22 either when located outboard of the lifting rotors 23, or when drawn inwardly into encasing relation with the lifting rotors for high speed flight. Further, no enlargement of the wing area results upon closure of the lifting rotor ducts so that minimum drag characteristics for high speed flight can be achieved.

While but one preferred embodiment of the present invention has been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. A convertible aircraft adapted for high speed forward flight and for vertical take-off and landing including a fuselage, means for forward propulsion of the aircraft, wing assemblies extending outwardly from opposite sides of the fuselage, each wing assembly comprising a movable airfoil wing designed to provide lift for the aircraft during high speed forward flight and a stationary root member fixed to the fuselage and extending laterally therefrom for supporting said airfoil wing, said root member housing a helicopter rotor unit therein including a rotor duct and a helicopter rotor rotatable within said duct about a vertical axis, means slidably supporting said airfoil wing in spanwise reciprocative movement on said root member from a retracted position wherein the airfoil wing abuts the fuselage to an extended position wherein said helicopter rotor unit is exposed, said airfoil wing having means completely encasing said root member when said airfoil wing is in retracted position, and power means for driving the rotors of said helicopter rotor units to provide the lift for sustaining the aircraft when said airfoil wings occupy said outward extended positions.

2. A convertible aircraft adapted for high speed forward flight and for vertical take-off and landing including a fuselage, means for forward propulsion of the aircraft, telescoping wing assemblies extending outwardly from opposite sides of the fuselage, each telescoping wing assembly comprising a stationary wing post fixed to the fuselage and extending laterally therefrom along the spanwise wing axis, said wing post having a helicopter rotor duct extending vertically therethrough and a lift rotor rotatable within said duct about a vertical axis, an airfoil wing designed to provide lift for the aircraft during high speed forward flight slidably supported on said wing post in encasing relation thereto for spanwise reciprocative movement from a retracted position wherein the wing abuts the fuselage and presents a smooth, uninterrupted aerodynamic surface for high speed forward flight to an extended position wherein said rotor duct and rotor are exposed, and power means for driving the rotors of each of said wing posts to provide the lift for sustaining the aircraft during low forward speed, hovering, and substantially vertical ascent and descent when the associated airfoil wing occupies said extended position.

3. A convertible aircraft adapted for high speed forward flight and for vertical take-off and landing including a fuselage, means for forward propulsion of the aircraft, telescoping wing assemblies extending outwardly from opposite sides of the fuselage, each telescoping wing assembly comprising a stationary wing post fixed to the fuselage and extending laterally therefrom along the spanwise wing axis, said wing post having a helicopter rotor duct extending vertically therethrough and a lift rotor rotatable within said duct about a vertical axis, an airfoil wing designed to provide a lift for the aircraft during high speed forward flight slidably supported on said wing post in encasing relation thereto for spanwise reciprocative movement from a retracted position wherein the wing abuts the fuselage and presents a smooth, uninterrupted aerodynamic surface for high speed forward flight to an extended position wherein said rotor duct and rotor are exposed, control means operative from the fuselage for retracting and extending said airfoil wings relative to their associated wing posts, and power means for driving the rotors of each of said wing posts to provide the lift for sustaining the aircraft during low forward speed, hovering, and substantially vertical ascent and descent when the associated airfoil wing occupies said extended position.

4. A convertible aircraft adapted for high speed forward flight and for vertical take-off and landing including a fuselage, means for forward propulsion of the aircraft, sliding wing assemblies extending outwardly from opposite sides of the fuselage, each of said wing assemblies comprising telescopically related inner and outer sections, said inner section being located immediately adjacent the fuselage and fixed thereto and said outer section having the configuration of a conventional wing including a smooth conventional airfoil surface providing the lift for the aircraft during high speed forward flight and having a cavity therein for entirely accommodating said inner section, said inner section of each of said oppositely extending wing assemblies having a helicopter rotor unit therein including a rotor duct and a lift rotor rotatable within said duct about a vertical axis, means slidably supporting said outer wing section upon said inner section for reciprocative movement spanwise of the wing assembly from an outwardly extended position wherein said outer wing section is spaced from the fuselage to expose the helicopter rotor units to an inwardly retracted position wherein said outer wing section abuts the fuselage and encases said inner section, means operative from the fuselage for retracting and extending said outer wing sections relative to their associated inner sections, and power means for driving the rotors of said helicopter rotor units to provide the lift for sustaining said aircraft when said outer wing sections occupy said outwardly extended positions.

5. A convertible aircraft adapted for high speed forward flight and for vertical take-off and landing including a fuselage, means for forward propulsion of the aircraft, a pair of lift rotor supporting frames fixed to the opposite sides of the fuselage at the wing location and extending spanwise from the fuselage, each of said lift rotor supporting frames having a cylindrical rotor duct extending vertically therethrough and a lift rotor supported for rotation about a vertical axis within said rotor duct, a closure sheath for each of said rotor ducts in the form of an airfoil wing designed to provide lift for the aircraft during high speed forward flight and having an inwardly opening cavity for wholly accommodating the associated lift rotor supporting frame therein, means slidably supporting said closure sheaths for spanwise reciprocative movement on said lift rotor supporting frames, pilot operative control means for selectively shifting said sheaths to an extended position wherein said rotor ducts are exposed to a retracted position wherein the sheaths abut the fuselage, and power means for driving the rotors to provide the lift for sustaining said aircraft when said sheaths occupy said extended position.

6. The combination recited in claim 1, wherein said stationary root members include spars forming the leading and trailing edges thereof extending spanwise of the aircraft, said spars having upwardly and downwardly opening track channels at the upper and lower edges thereof forming trackways, and wherein said airfoil wings have rollers tracking in said track channels for guiding said airfoil wings spanwise along said root members.

References Cited in the file of this patent
UNITED STATES PATENTS

| | | |
|---|---|---|
| 1,763,454 | Berry | June 10, 1930 |
| 1,841,936 | Bruns | Jan. 19, 1932 |